United States Patent [19]
Chung et al.

[11] Patent Number: 5,978,510
[45] Date of Patent: Nov. 2, 1999

[54] METHOD AND APPARATUS FOR PREDICTIVELY CODING CONTOUR OF VIDEO SIGNAL

[75] Inventors: Jae Won Chung, Seoul; Jae Kyoon Kim, Taejon; Joo Hee Moon; Ji Heon Kweon, both of Seoul, all of Rep. of Korea

[73] Assignee: Hyundai Electronics Industries Co., Ltd., Kyoungki-do, Rep. of Korea

[21] Appl. No.: 08/954,912

[22] Filed: Oct. 21, 1997

Related U.S. Application Data

[63] Continuation of application No. 08/858,552, May 19, 1997, abandoned, and application No. 08/861,356, May 21, 1997, abandoned.

[30] Foreign Application Priority Data

Mar. 20, 1997 [KR] Rep. of Korea ............ 97-9531

[51] Int. Cl.⁶ ............................................... G06K 9/34
[52] U.S. Cl. ............................................... 382/238
[58] Field of Search .................... 382/199, 203, 382/232, 236, 238, 239, 242, 243, 248, 250, 252; 348/400–402, 407, 409–416, 420, 699, 384, 390

[56] References Cited

U.S. PATENT DOCUMENTS

| | | | |
|---|---|---|---|
| 5,686,973 | 11/1997 | Lee | 382/236 |
| 5,691,769 | 11/1997 | Kim | 382/242 |
| 5,737,449 | 4/1998 | Lee | 382/242 |
| 5,754,703 | 5/1998 | Kim | 382/242 |
| 5,774,595 | 6/1998 | Kim | 382/242 |
| 5,793,893 | 8/1998 | Kim | 382/242 |

FOREIGN PATENT DOCUMENTS

| | | |
|---|---|---|
| 7-298270 | 11/1995 | Japan . |
| 8-116540 | 5/1996 | Japan . |
| 8-280030 | 8/1996 | Japan . |
| 10-208060 | 8/1998 | Japan . |

*Primary Examiner*—Jose L. Couso
*Attorney, Agent, or Firm*—McAulay Nissen Goldberg Kiel & Hand, LLP

[57] ABSTRACT

A method and an apparatus for predictively coding a contour of a video signal. An error between the current contour and the previous contour is obtained through the comparison therebetween. If the obtained error is greater than or equal to a predetermined reference value, the current contour is coded. However, in the case where the obtained error is smaller than the predetermined reference value, only a signal indicative of the reconstruction of the current contour using the previous contour is transmitted to a decoder. Therefore, the transmission of unnecessary information is prevented to enhance the compression coding efficiency.

15 Claims, 12 Drawing Sheets

— transmission contour
— predicted contour

METHOD AND APPARATUS FOR PREDICTIVELY CODING CONTOUR OF VIDEO SIGNAL

This is a continuation of pending application Ser. No. 08/858,552 filed May 19, 1997, now abandoned and U.S. Ser. No. 08/861,356, filed May 21, 1997 now abandoned.

BACKGROUND OF THE INVENTION

1. Field of the Invention

The present invention relates in general to a method and an apparatus for predictively coding a contour of a video signal, and more particularly to a method and an apparatus for comparing a contour (referred to hereinafter as current contour) of the current object image with a contour (referred to hereinafter as previous contour) of the previous object image to obtain a difference therebetween and coding the current contour only when the obtained difference exceeds a predetermined reference value. For example, the present invention is applicable to a shape information coding method of the moving picture experts group-4 (referred to hereinafter as MPEG-4) which is an international standard on moving pictures and audio coding, and other image coding methods considering shape information.

2. Description of the Prior Art

Recently, ISO/IEC/WG11 has considered a method of coding an object with arbitrary shape information, differently from MPEG-1 and MPEG-2 performing frame-unit coding.

Here, a given video is divided into a background image and an object image, and a rectangle including the divided background image and object image is defined as a video object plane (referred to hereinafter as VOP). In MPEG-4, in the case where object regions including desired objects or areas are present in images, they are divided into VOPs and the divided VOPs are coded individually.

Such a VOP has the advantage of freely synthesizing or disintegrating a natural image or an artificial image as the unit of object image. As a result, the VOP is a fundamental factor in processing an object image in fields such as computer graphics, multimedia, etc.

FIG. 1 is a block diagram illustrating the construction of a conventional verification model encoder 10, firstly established by ISO/IEC JTC1/SC29/WG11 MPEG96/N1172 JANUARY. As shown in this drawing, the encoder 10 comprises a VOP formation unit 11, VOP coders 12A, 12B, . . . , 12N and a multiplexer 13.

The VOP formation unit 11 is adapted to input an image sequence to be transmitted or stored, divide the inputted image sequence into object images and form VOPs corresponding respectively to the divided object images.

FIG. 2 is a view illustrating a conventional VOP with shape information, which is partitioned into macro blocks. As shown in this drawing, the VOP contains an object image of "cat". Here, a horizontal size of the VOP is defined as a VOP width and a vertical size thereof is defined as a VOP height. The left top corner of the VOP is defined as a grid start point, and the VOP is partitioned into M×N macro blocks, each of which includes M pixels on the X-axis and N pixels on the Y-axis. For example, the VOP may be partitioned into 16×16 macro blocks, each of which includes 16 pixels on the X-axis and 16 pixels on the Y-axis.

Noticeably, in the case where macro blocks at the rightmost and bottom portions of the VOP do not include M pixels on the X-axis and N pixels on the Y-axis, respectively, the VOP is enlarged in size in such a manner that the X and Y-axis pixels of each of the macro blocks can be M and N in number, respectively.

Both M and N are set to an even number so that a texture coder can perform sub block-unit coding, as will be mentioned later.

Conventionally, in coding a moving picture in the unit of object, shape information are transmitted together with motion information beginning with that having the highest priority, for the prediction of motion compensation. At this time, different motion information must be applied to adjacent pixels on the object boundary.

Several approaches to representing such an area boundary have been proposed in fields such as computer graphics, character recognition, object synthesis, etc. For example, such approaches may be chain coding, polygon approximation and spline approximation. However, such approaches do not consider transmission. In this connection, it is difficult to transmit coded shape information of a motion region of each frame because of a high transmission rate.

A contour predictive coding method has been suggested to solve the above problem. A high redundancy is present between shape information of a motion region of the same object in successive images. On the basis of such a characteristic, the contour predictive coding method is adapted to perform motion compensation prediction of a contour and transmit the predicted error to reduce a shape information transmission amount. Shape information of a motion region of the same object on successive frames are very analogous in form and position. As a result, the current shape information can be predicted on the basis of the previous shape information. Further, motion information of a moving object is estimated and motion compensation prediction is performed with respect to shape information according to the estimated motion information. In the case where the motion region extraction and motion information estimation are ideally accurate, the transmission of shape information is not necessary.

However, in the above-mentioned contour predictive coding method, the shape information becomes more important as the transmission rate becomes lower. In this connection, an efficient coding method is required to significantly reduce shape information to obtain a higher coding gain than that of a block-unit coding method requiring no transmission of shape information.

In order to solve the problem with the above-mentioned contour predictive coding method, there have been proposed thresholding operation and contour approximation, which are disclosed in U.S. patent application Ser. No. 08/478,558, filed in the name of Hyundai Electronics Industrious Co, Ltd. The thresholding operation and contour approximation will hereinafter be described briefly.

FIG. 5 is a schematic view illustrating shape information of the previous and current frames and FIG. 6 is a schematic view illustrating a variation when the current frame in FIG. 5 is motion-compensated along a motion region of the previous frame in FIG. 5. Nine isolated error areas appear as shown in FIG. 6. The thresholding operation and contour approximation are performed with respect to each of the predictive error areas. A contour of a predictive error area decided on transmission is transmitted according to a characteristic of the corresponding area. At this time, the contour is transmitted approximately rather than accurately for the reduction of shape information. Therefore, information having no effect on the human's eyesight, or information having no effect on the subjective picture quality is not transmitted to make coding at a low transmission rate possible.

FIGS. 7A to 7C are schematic views illustrating polygon and spline approximations. A contour of a predictive error area decided on transmission is first approximated to a polygon. At this time, the number of vertices of the contour is determined according to the polygon approximation level and a spline is obtained along the vertices.

FIGS. 8A to 8C are schematic views illustrating approximation using a predictive contour. First, an error of the predictive contour is obtained for the approximation of a transmission contour of an error area resulting from motion information estimation, not motion region extraction. Then, the transmission contour is drawn on the frame according to the obtained error. In this case, the spline approximation is not necessary.

On the other hand, a contour approximation method, proposed in HOETTER thesis, is to approximate all contours of a motion region, perform motion compensation prediction of vertices used in the approximation and transmit the resultant error. However, such contour approximation method has a disadvantage in that all the contours are always approximated although all of them are not coded.

SUMMARY OF THE INVENTION

Therefore, the present invention has been made in view of the above problems, and it is an object of the present invention to provide a method and an apparatus for predictively coding a contour of a video signal to remove a time-axis contour redundancy. A difference between the current contour and the previous contour is obtained through the comparison therebetween. Only when the obtained difference exceeds a predetermined reference value, the current contour is coded. Otherwise, only a signal indicative of the reconstruction of the current contour using the previous contour is transmitted to a decoder. Therefore, conventional individual contour compression is not performed, resulting in an increase in compression coding efficiency.

In accordance with one aspect of the present invention, there is provided a method for predictively coding a contour of a video signal, comprising the first step of comparing the current contour with the previous contour to obtain an error therebetween and then comparing the obtained error with a predetermined reference value to check whether the obtained error is greater than or equal to the predetermined reference value; the second step of coding the current contour if it is checked at the first step that the obtained error is greater than or equal to the predetermined reference value; and the third step of reconstructing the current contour using the previous contour if it is checked at the first step that the obtained error is smaller than the predetermined reference value.

The first step includes the step of determining the nearest distance of each of pixels in the current contour to the previous contour as a current contour pixel error, detecting the maximum one of the determined current contour pixel errors, determining the nearest distance of each of pixels in the previous contour to the current contour as a previous contour pixel error, detecting the maximum one of the determined previous contour pixel errors and comparing the larger one of the detected maximum current and previous contour pixel errors with the predetermined reference value.

Also, the first step may include the step of moving the previous contour to a position of the current contour and comparing the nearest inter-pixel distance between the current contour and the previous contour with the predetermined reference value.

The contour moving position is determined in a motion compensation prediction manner where contour moving direction, speed and time are considered.

Alternatively, the contour moving position may be determined in a non-motion compensation prediction manner.

Further, the first step includes the step of moving the current contour to a position of the previous contour and comparing the nearest inter-pixel distance between the current contour and the previous contour with the predetermined reference value.

The contour moving position is determined in a motion compensation prediction manner.

Alternatively, the contour moving position may be determined in a non-motion compensation prediction manner.

The previous contour is the most recently coded contour.

The contour predictive coding method further comprises the step of detecting the nearest distance of each of pixels in the current contour to the previous contour and setting a negligible one of the detected distances to the reference value.

The contour predictive coding method may further comprise the step of detecting the nearest distance of each of pixels in the previous contour to the current contour and setting a negligible one of the detected distances to the reference value.

The contour predictive coding method may further comprise the step of detecting the nearest distance of each of pixels in the current contour to the previous contour, detecting the nearest distance of each of pixels in the previous contour to the current contour and setting a negligible one of the detected distances to the reference value.

A bit of logic "1" or "0" is transmitted to a decoder to indicate whether the current contour is coded or not. The bit is contained in a bit stream to be transmitted to the decoder.

The bit of logic "1" indicates that the current contour is coded.

The bit of logic "0" indicates that the current contour is not coded.

A plurality of bits may be transmitted to the decoder to indicate whether the current contour is coded or not. The bits are contained in a bit stream to be transmitted to the decoder.

The current contour is not coded if it is checked at the first step that the obtained error is smaller than the predetermined reference value.

In accordance with another aspect of the present invention, there is provided an apparatus for predictively coding a contour of a video signal, comprising corresponding contour detection means for comparing the current contour with reconstructed contours stored in a memory to detect the reconstructed contour most approximate to the current contour from the memory; coding determination means for comparing the current contour with the reconstructed contour from the memory to determine whether the current contour is to be coded; encoding means for encoding the current contour in response to an output signal from the coding determination means, the encoding means including vertex reconstruction means for reconstructing new vertices on the basis of polygon approximation, and vertex insertion means for inserting the new vertices reconstructed by the vertex reconstruction means into a vertex list therein; and contour reconstruction means for reconstructing the contour encoded by the encoding means.

The coding determination means compares the current contour with the previous contour in an inter mode to obtain an error therebetween, determines that the current contour is to be coded, if the obtained error is larger than a reference value, and determines that the current contour is not to be coded, if the obtained error is smaller than the reference value.

In brief, an error between the current contour and the previous contour is obtained through the comparison therebetween. If the obtained error is greater than or equal to a predetermined reference value, the current contour is coded. However, in the case where the obtained error is smaller than the predetermined reference value, the current contour is reconstructed using the previous contour. Therefore, a time-axis redundancy of a binary mask is removed to prevent the transmission of unnecessary information, resulting in an increase in compression coding efficiency.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

For a better understanding of the present invention, the fundamental conception will first be mentioned before detailed description of the preferred embodiments.

The current contour may be reconstructed in a receiver (i.e., decoder) in a polygon approximation manner using vertices of the previous contour stored in a memory of the receiver. An error between the current contour and the previous contour or the reconstructed contour is obtained through the comparison therebetween. If the obtained error is greater than a predetermined reference value, the current contour is coded. However, in the case where the obtained error is smaller than the predetermined reference value, the current contour is not coded and only not-coded mode information is transmitted to the receiver. In this case, the receiver reconstructs the current contour using the vertices of the previous contour stored in the memory.

On the other hand, in the case where an error between the reconstructed contour and the current contour and an error between the previous contour and the current contour are both larger than the reference value, the reconstructed contour is used for coding.

A negligible one of nearest inter-pixel distances between the current contour and the previous contour is detected by repetitive experiments and then set to the reference value. In other words, the reference value is set to a distance between the current contour and the previous contour which has little effect on the original image although the contour motion is neglected.

Figure 2:
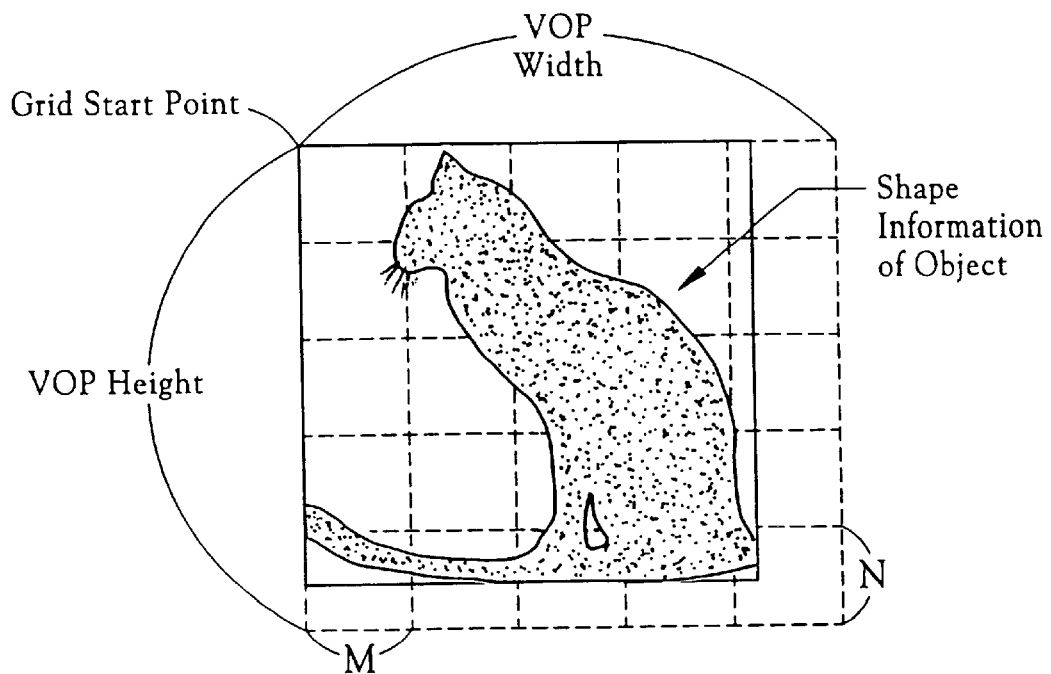
FIG. 2 is a view illustrating a conventional VOP with shape information, which is partitioned into macro blocks.

As stated previously with reference to FIG. 2, conventionally, the VOP is composed of MxN macro blocks beginning with the grid start point at the left top corner, each of which includes M pixels on the X-axis and N pixels on the Y-axis. However, in the case where pixels having object image or shape information are present in many macro blocks, the number of macro blocks to be shape information-coded is increased, resulting in a degradation in coding efficiency.

On the other hand, the VOPs formed by the VOP formation unit 11 are respectively coded by the VOP coders 12A, 12B, . . . , 12N, multiplexed by the multiplexer 13 and transmitted as a bit stream.

Figure 3:
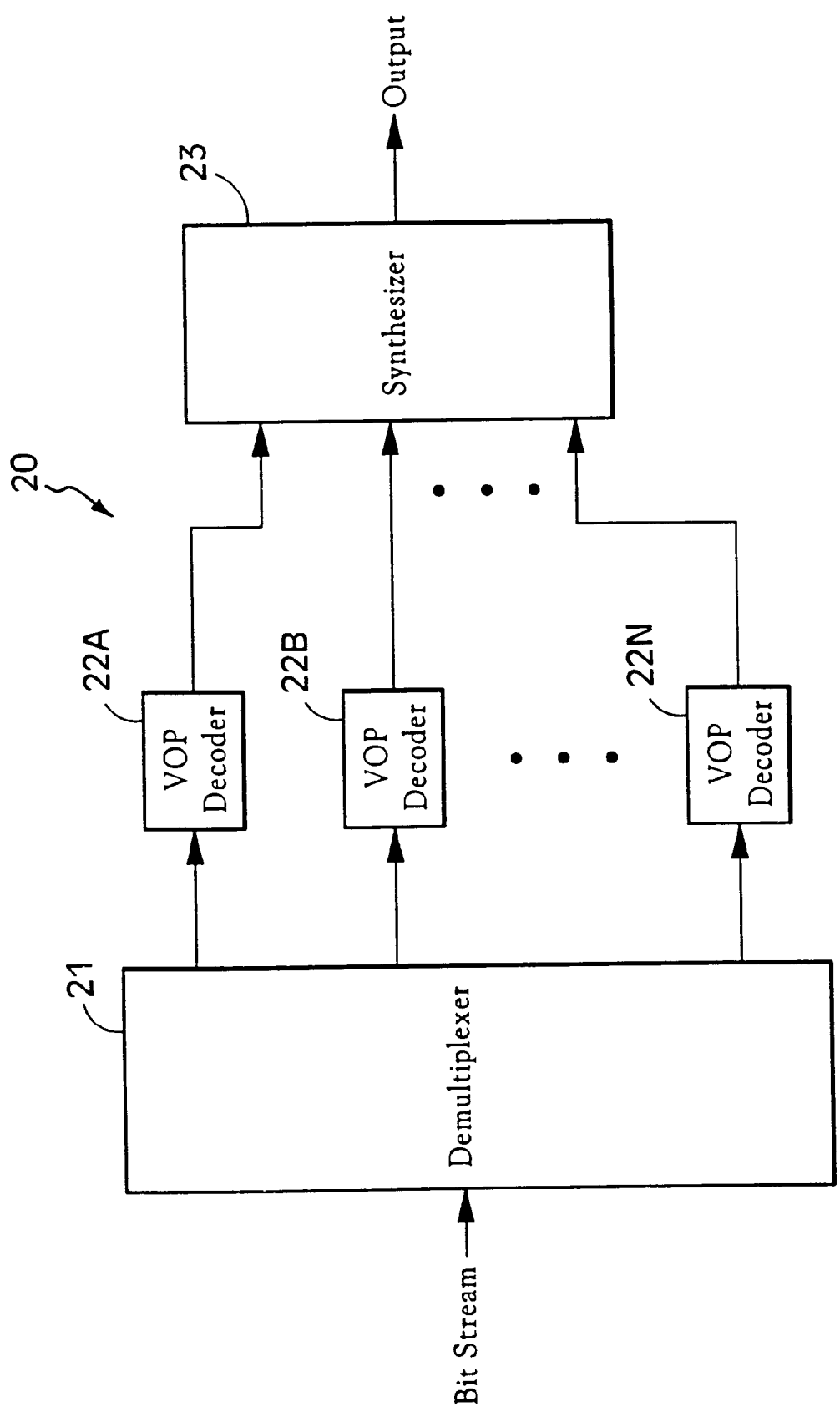
FIG. 3 is a block diagram illustrating the construction of a conventional decoder.

FIG. 3 is a block diagram illustrating the construction of a conventional verification model decoder 20, firstly established by ISO/IEC JTC1/SC29/WG11 MPEG96/N1172 JANUARY. As shown in this drawing, the decoder 20 comprises a demultiplexer 21, VOP decoders 22A, 22B, . . . , 22N and a synthesizer 23.

Figure 1:
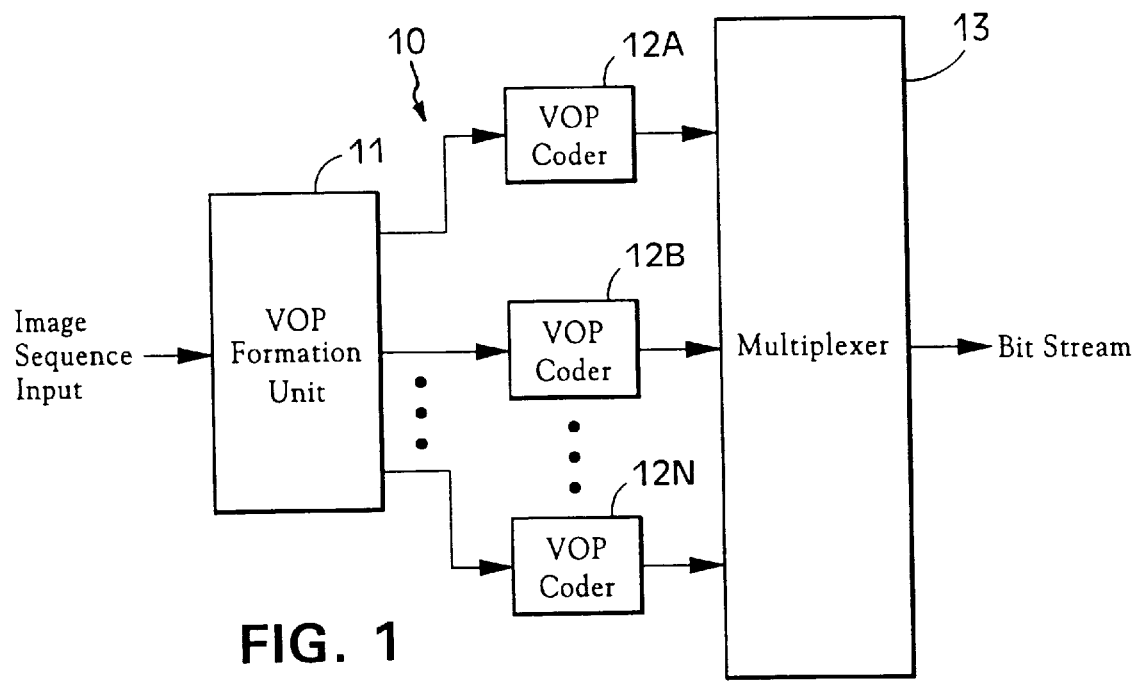
FIG. 1 is a block diagram illustrating the construction of a conventional encoder.

The VOP information coded and transmitted as the bit stream by the encoder 10 in FIG. 1 is divided into VOP coded signals by the demultiplexer 21.

The VOP coded signals from the demultiplexer 21 are decoded respectively by the VOP decoders 22A, 22B, . . . , 22N and synthesized into the original images by the synthesizer 23.

Figure 4:
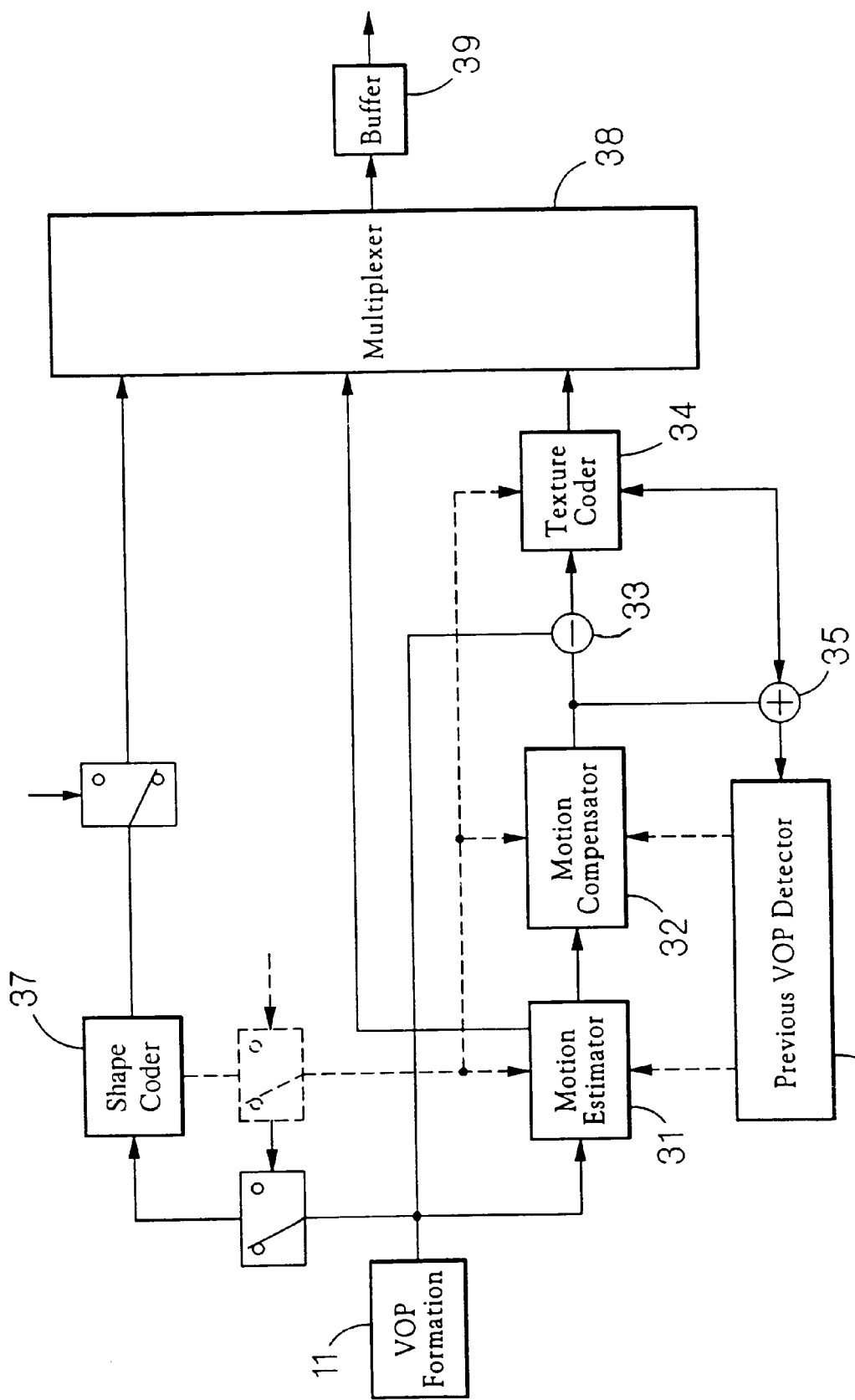
FIG. 4 is a block diagram illustrating the construction of a VOP coder in the encoder of FIG. 1.
Figure 5:
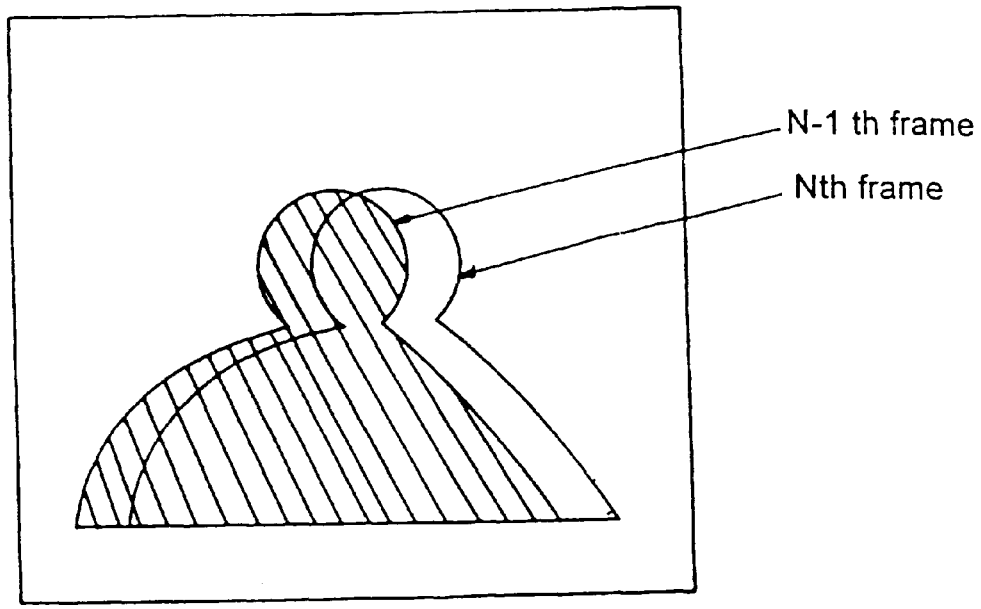
FIG. 5 is a schematic view illustrating shape information of the previous and current frames.
Figure 6:
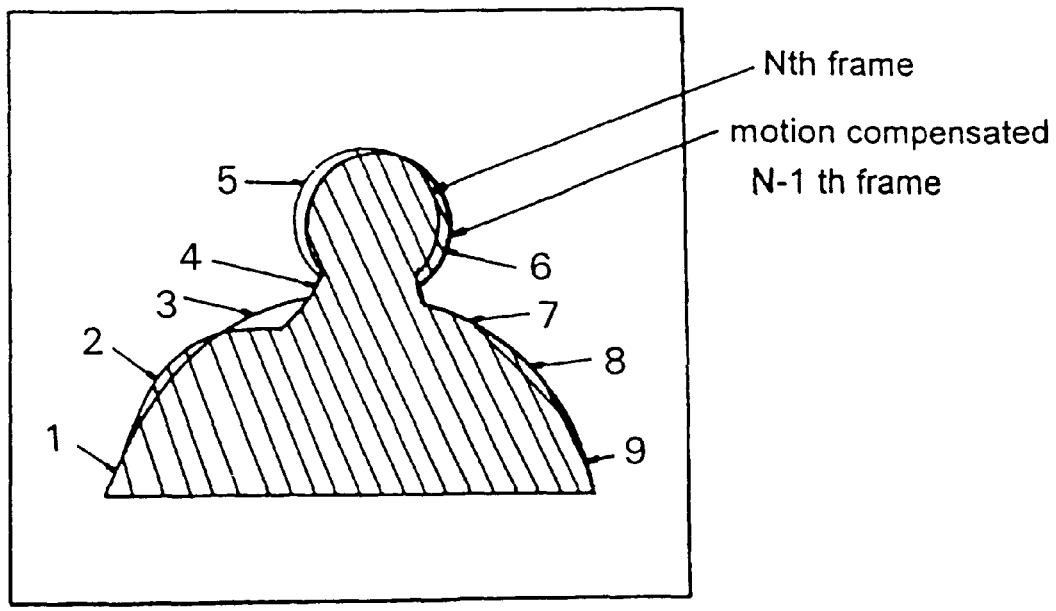
FIG. 6 is a schematic view illustrating a variation when the current frame in FIG. 5 is motion-compensated along a motion region of the previous frame in FIG. 5.
Figure 7A:
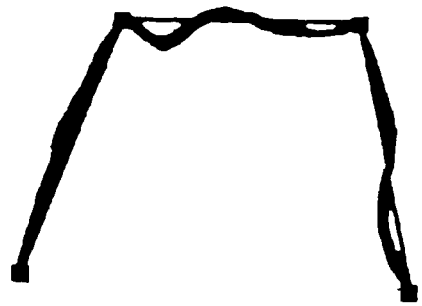
FIGS. 7A to 7C are schematic views illustrating polygon and spline approximations.
Figure 7B:
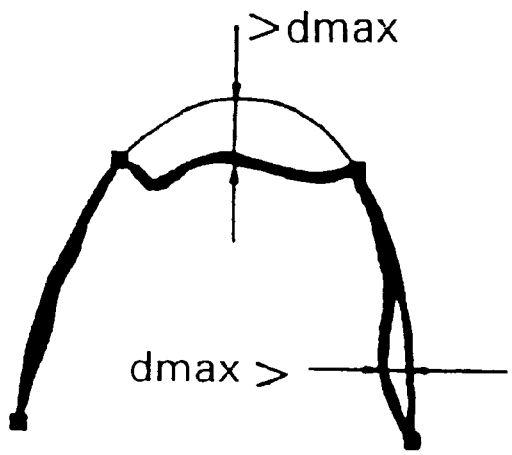
Figure 7C:
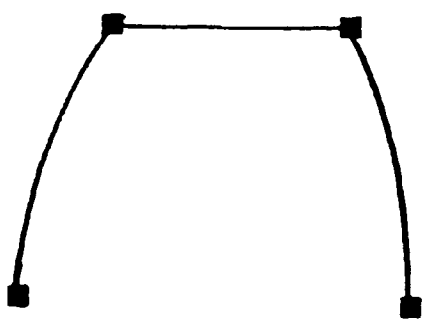
Figure 8A:
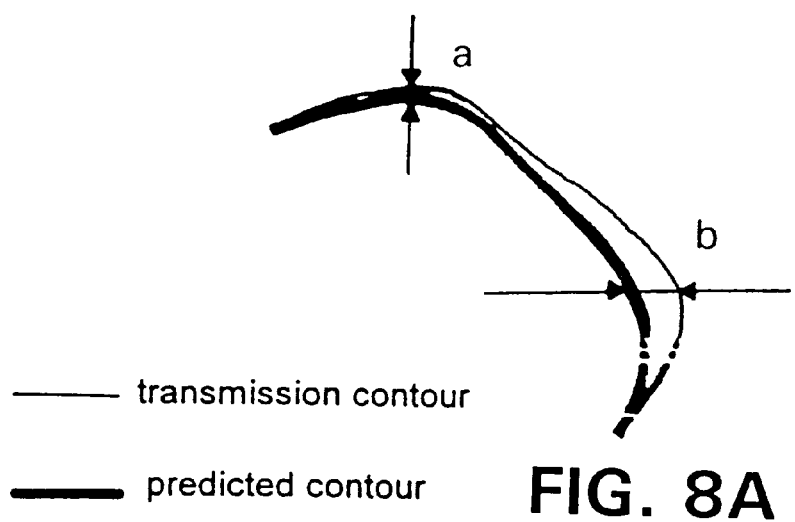
FIGS. 8A to 8C are schematic views illustrating approximation using a predictive contour.
Figure 8B:
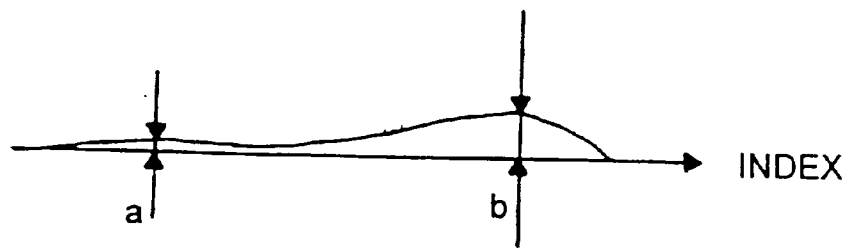
Figure 8C:
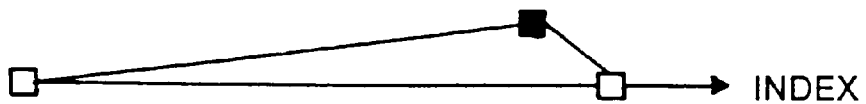

FIG. 4 is a block diagram illustrating the construction of each of the VOP coders 12A, 12B, . . . , 12N in the encoder 10 in FIG. 1. As shown in this drawing, each VOP coder includes a motion estimator 31, a motion compensator 32, a subtracter 33, a texture coder 34, an adder 35, a previous VOP detector 36, a shape coder 37, a multiplexer 38 and a buffer 39.

The motion estimator 31 is adapted to estimate macro block-unit motion of the corresponding VOP from the VOP formation unit 11.

The motion compensator 32 is adapted to compensate for the motion information estimated by the motion estimator 31.

The subtracter 33 is adapted to detect a difference between the VOP from the VOP formation unit 11 and the motion-compensated VOP from the motion compensator 32.

The texture coder 34 is adapted to code texture information in the unit of sub block in macro block in response to the difference detected by the subtracter 33. Each macro block is subdivided into sub blocks. For example, if M and N are 16 and each sub block includes M/2 pixels on the X-axis and N/2 pixels on the Y-axis, then each macro block is subdivided into 8×8 sub blocks. The texture information is coded in the unit of sub block.

The adder 35 is adapted to add the texture information coded by the texture coder 34 to the motion-compensated VOP from the motion compensator 32.

The previous VOP detector 36 is adapted to detect a previous VOP, or a VOP of an image just before the current image, from an output signal from the adder 35.

The previous VOP detected by the previous VOP detector 36 may be applied to the motion estimator 31 and the motion compensator 32 to be used for the motion estimation and compensation.

The shape coder 37 is adapted to code shape information of the VOP from the VOP formation unit 11.

Noticeably, an output signal from the shape coder 37 is variably used according to fields to which the VOP coders 12A, 12B, . . . , 12N are applied. As indicated by the dotted lines in the drawing, the output signal from the shape coder 37 may be provided to the motion estimator 31, the motion compensator 32 and the texture coder 34 to be used for the motion estimation and compensation and the texture information coding.

The motion information estimated by the motion estimator 31, the texture information coded by the texture coder 34 and the shape information coded by the shape coder 37 are multiplexed by the multiplexer 38 and transmitted through the buffer 39 to the multiplexer 13 in FIG. 1 for the transmission in the form of bit stream.

In MPEG-4, various shape coding techniques can be applied to the shape coder 37 which codes shape information of each VOP from the VOP formation unit 11. For example, one such technique may be an MMR shape coding technique which codes shape information on the basis of NxN blocks, where N=16, 8 or 4. Other shape coding techniques may be a vertex-based shape coding technique, a baseline-based shape coding technique, a context-based arithmetic coding technique, etc.

On the other hand, the VOP may include one or more contours according to the type of object. For example, the VOP includes one contour in the case of an object image of "cat" shown in FIG. 2.

Figure 9A:
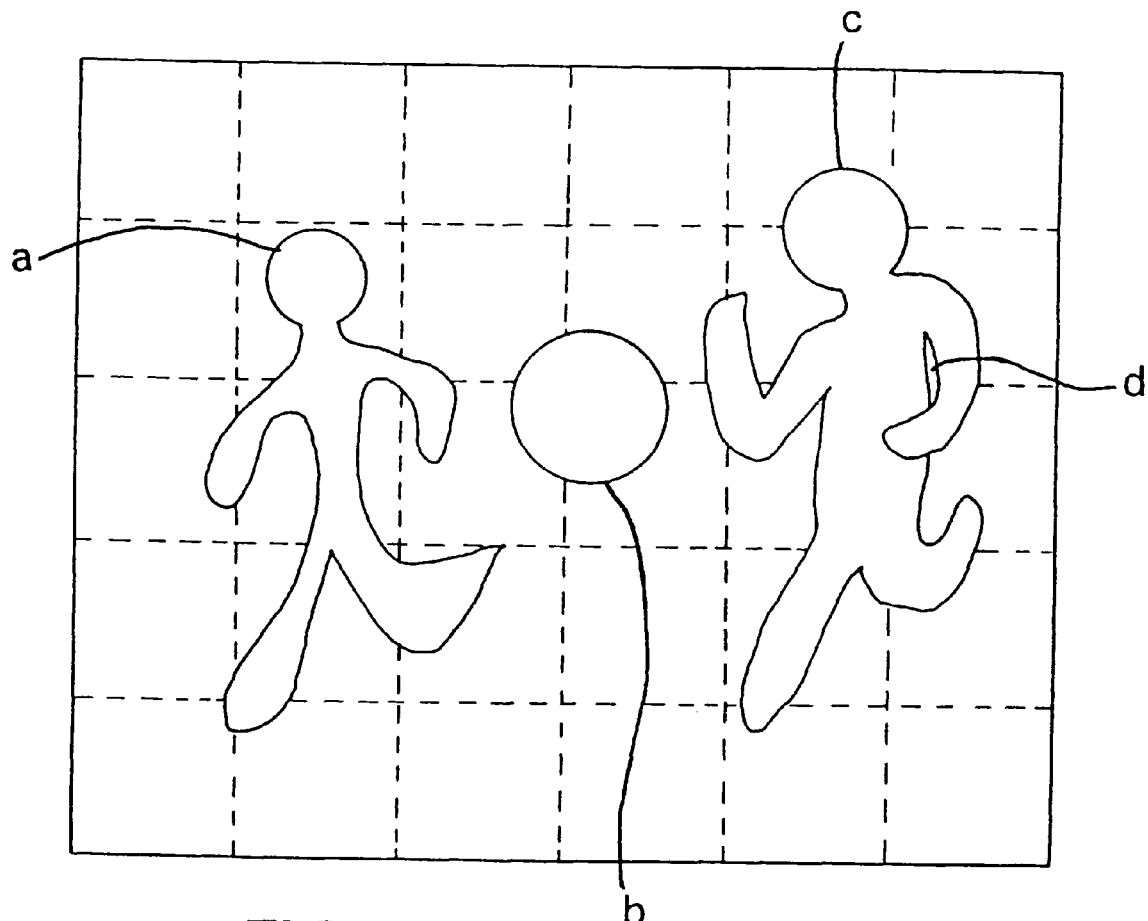
FIG. 9A is a view illustrating the previous state of a VOP including a plurality of contours.
Figure 9B:
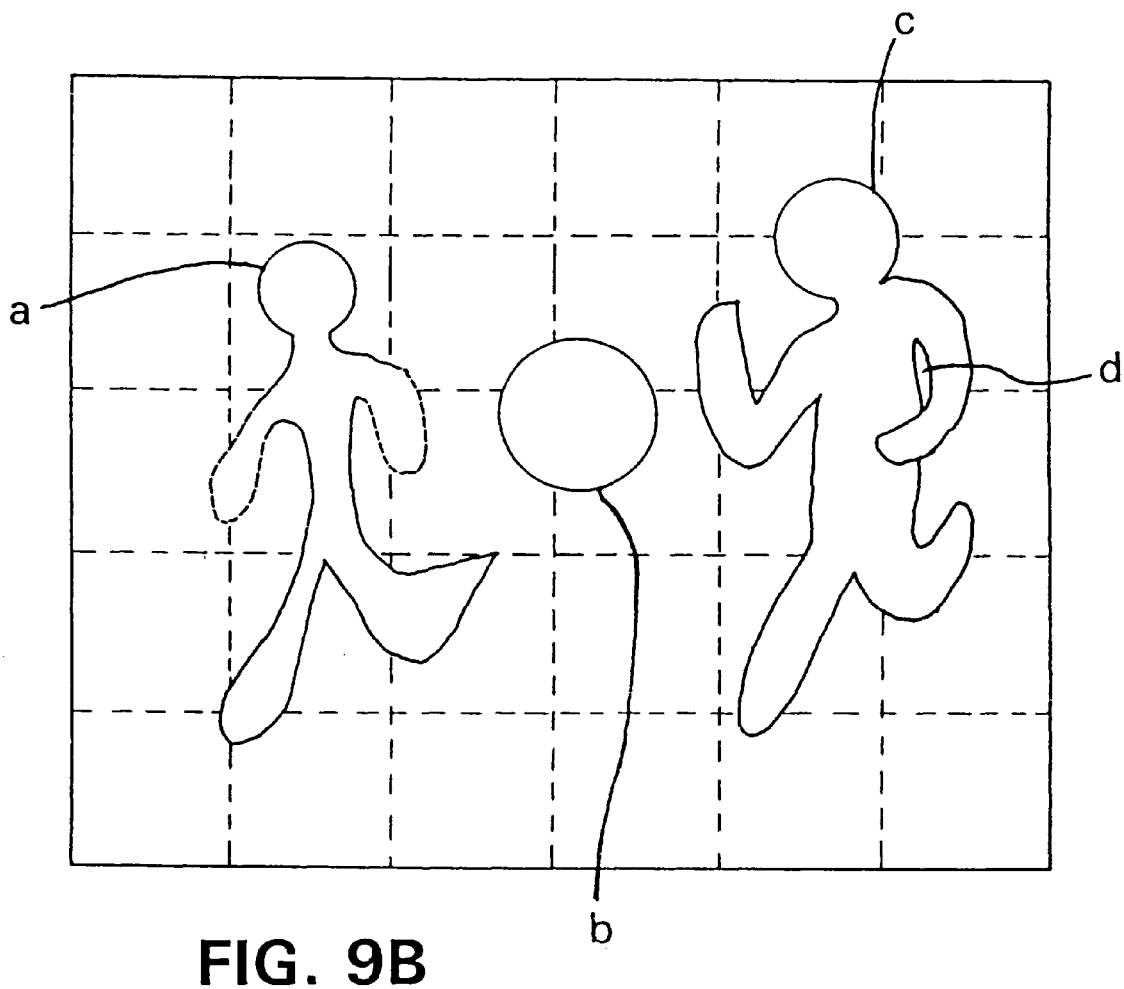
FIG. 9B is a view illustrating the current state of the VOP in FIG. 9A after variation.
Figure 9C:
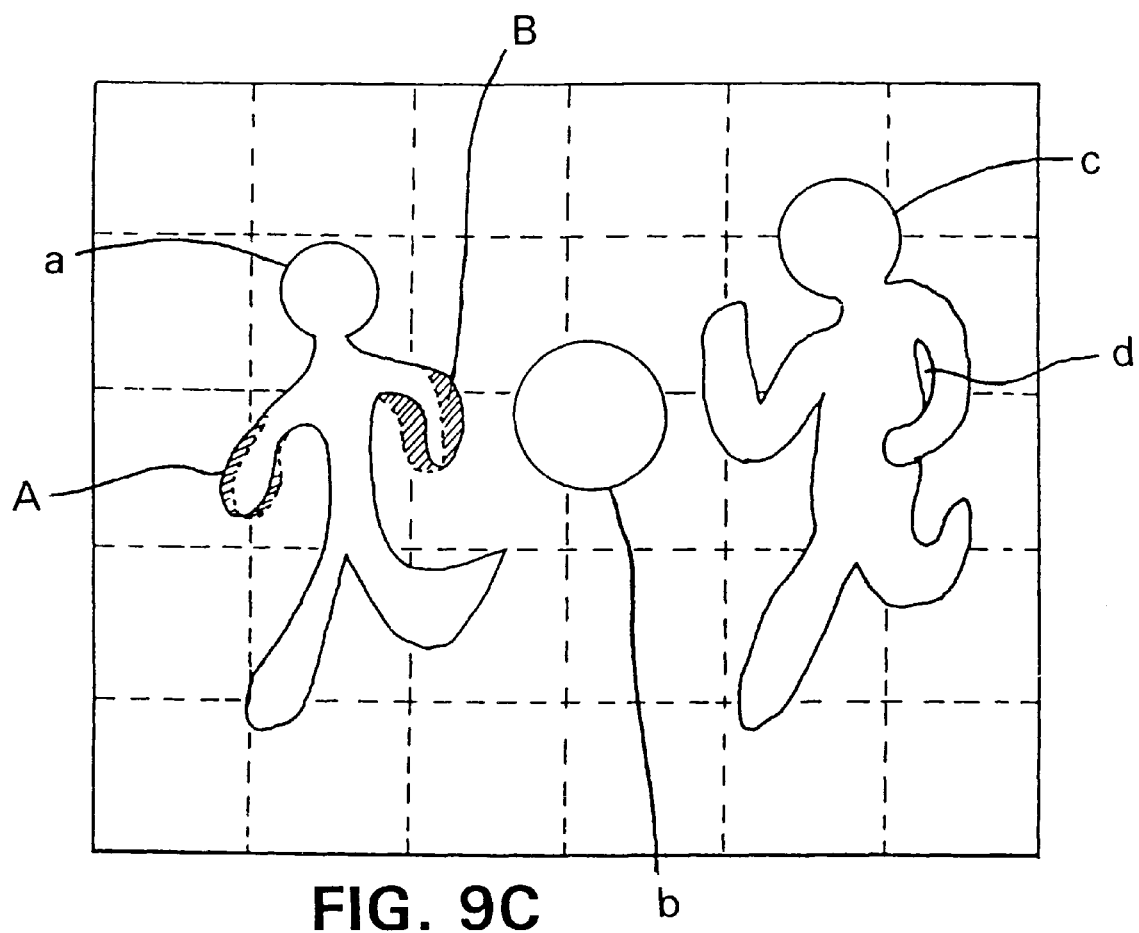
FIG. 9C is a view illustrating the overlapped state of the VOP in FIGS. 9A and 9B.

In the case of an object image of "ball-playing children" shown in FIG. 9A, the VOP includes four contours, or a contour a regarding the left child, a contour b regarding the ball, and contours c and d regarding the right child. If the coding of the contour c is determined, the contour d may be coded in the same manner as the contour c. FIG. 9B shows the current contours. FIG. 9C shows the overlapped state of FIGS. 9A and 9B. In this drawing, "A" indicates that a variation between the previous and current contours is smaller than a reference value, and "B" indicates that the variation between the previous and current contours is larger than the reference value. In the case of "B", the current contour is coded. However, in the case of "A", the current contour is reconstructed using the previous contour.

Figure 10:
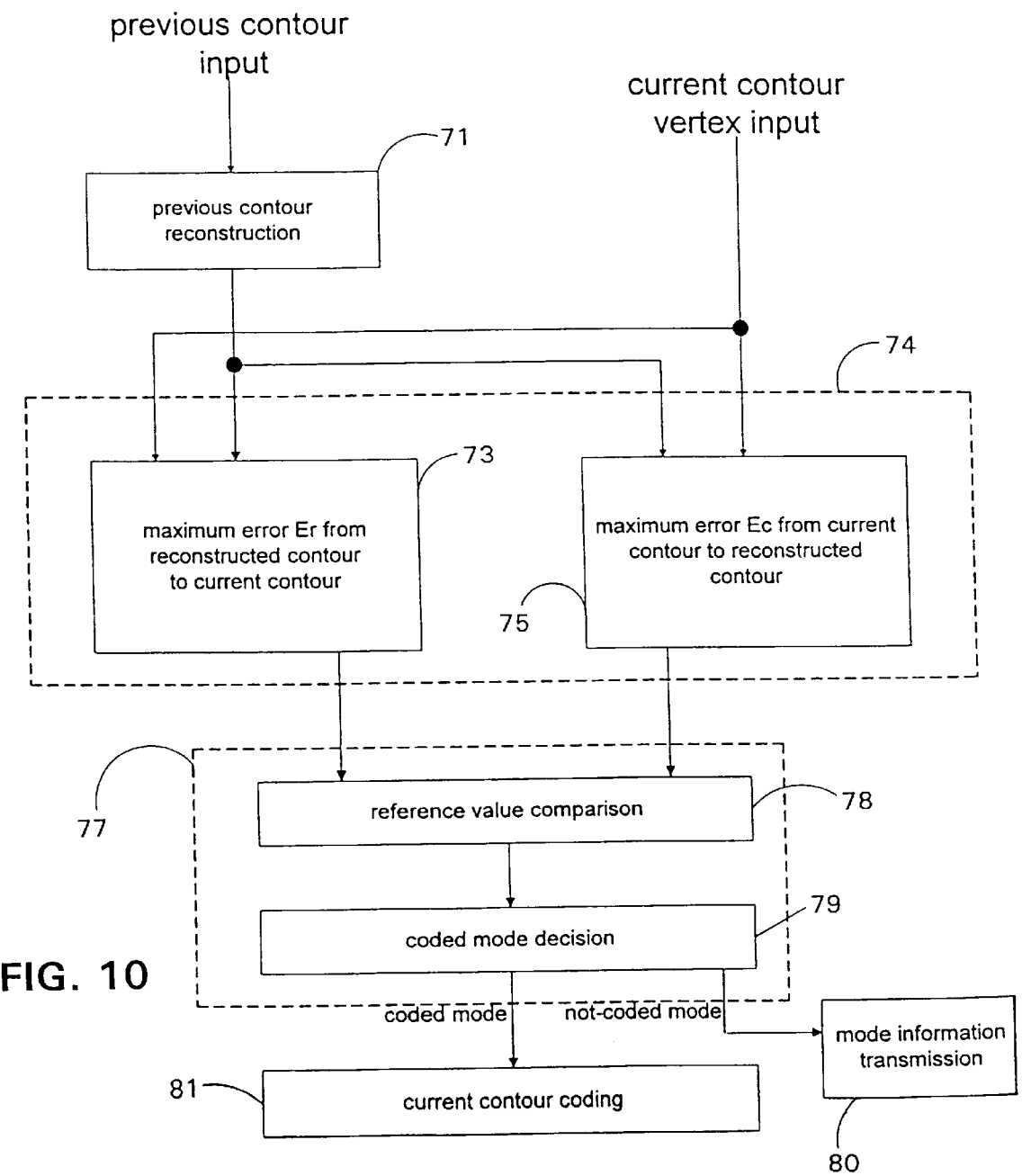
FIG. 10 is a flowchart schematically illustrating the fundamental conception of the present invention.

FIG. 10 is a flowchart schematically illustrating the fundamental conception of the present invention.

First, if vertices of the previous contour is inputted, the previous contour reconstruction step 71 is performed to reconstruct the previous contour on the basis of the inputted vertices. The error calculation step 74 is performed to compare the current contour with the previous contour reconstructed at the previous contour reconstruction step 71 to obtain an error therebetween.

The error calculation step 74 includes the first error calculation step 73 and the second error calculation step 75. The second error calculation step 75 is performed to determine the nearest distance of each of pixels in the current contour to the previous contour as a current contour pixel error and detect the maximum one of the determined current contour pixel errors. The first error calculation step 73 is performed to determine the nearest distance of each of pixels in the previous contour to the current contour as a previous contour pixel error and detect the maximum one of the determined previous contour pixel errors.

The coded mode decision step 77 includes the reference value comparison step 78 and the coded mode decision step 79. The reference value comparison step 78 is performed to compare the error detected at the first error calculation step 73 or the second error calculation step 75 with a reference value. The coded mode decision step 79 is performed to decide the current mode on a coded mode or a not-coded mode in accordance with the result compared at the reference value comparison step 78.

If the current mode is decided on the coded mode at the coded mode decision step 77, one bit (for example, logic 1) indicative of the coded mode is transmitted to the current contour coding step 81. However, in the case where the current mode is decided on the not-coded mode at the coded mode decision step 77, the current contour is not coded, and reconstructed. In this case, one bit (for example, logic 0) indicative of the not-coded mode is transmitted at the mode information transmission step 83.

Figure 11:
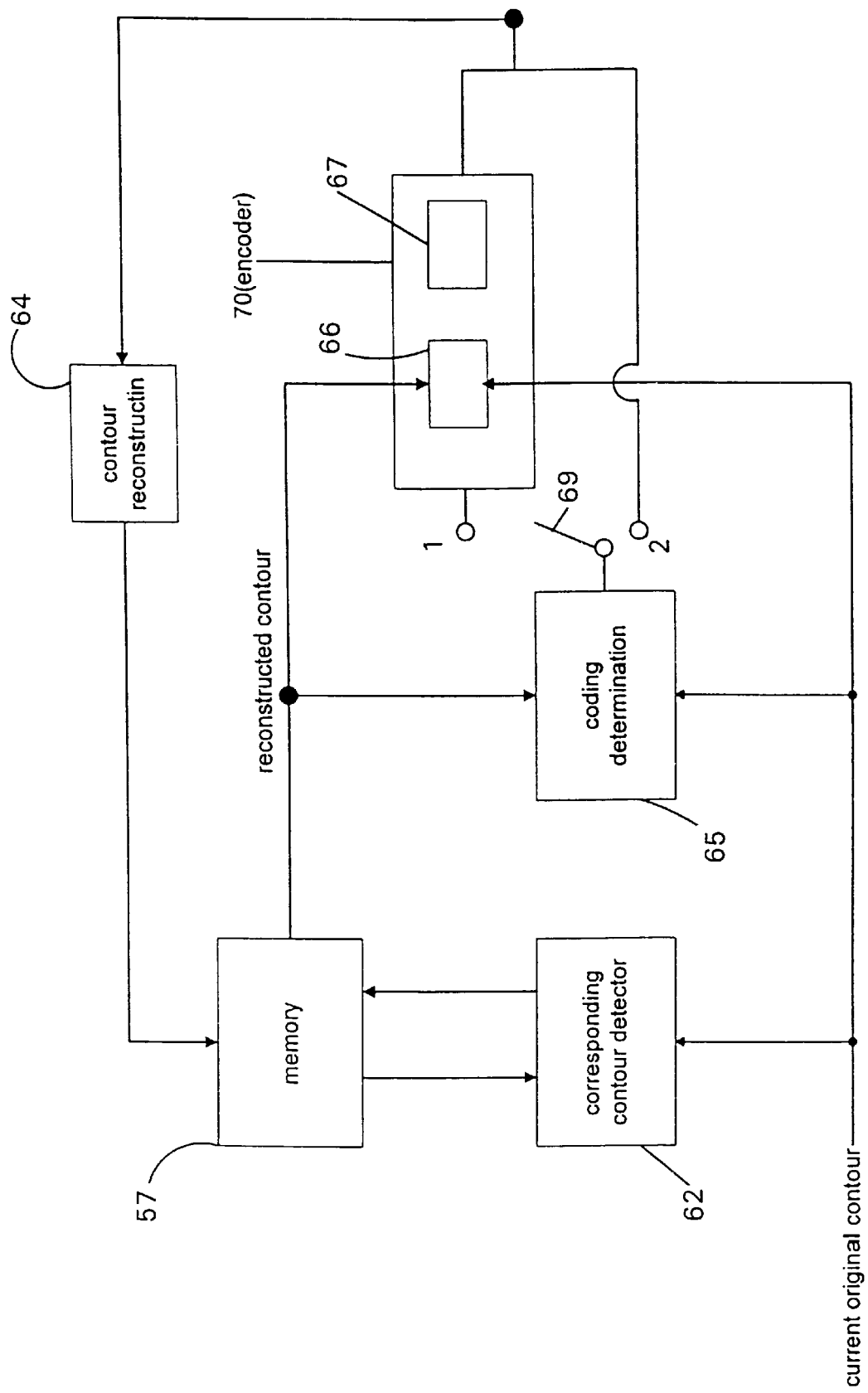
FIG. 11 is a schematic block diagram illustrating the construction of an apparatus for predictively coding a contour of a video signal in accordance with the present invention.
Figure 12:
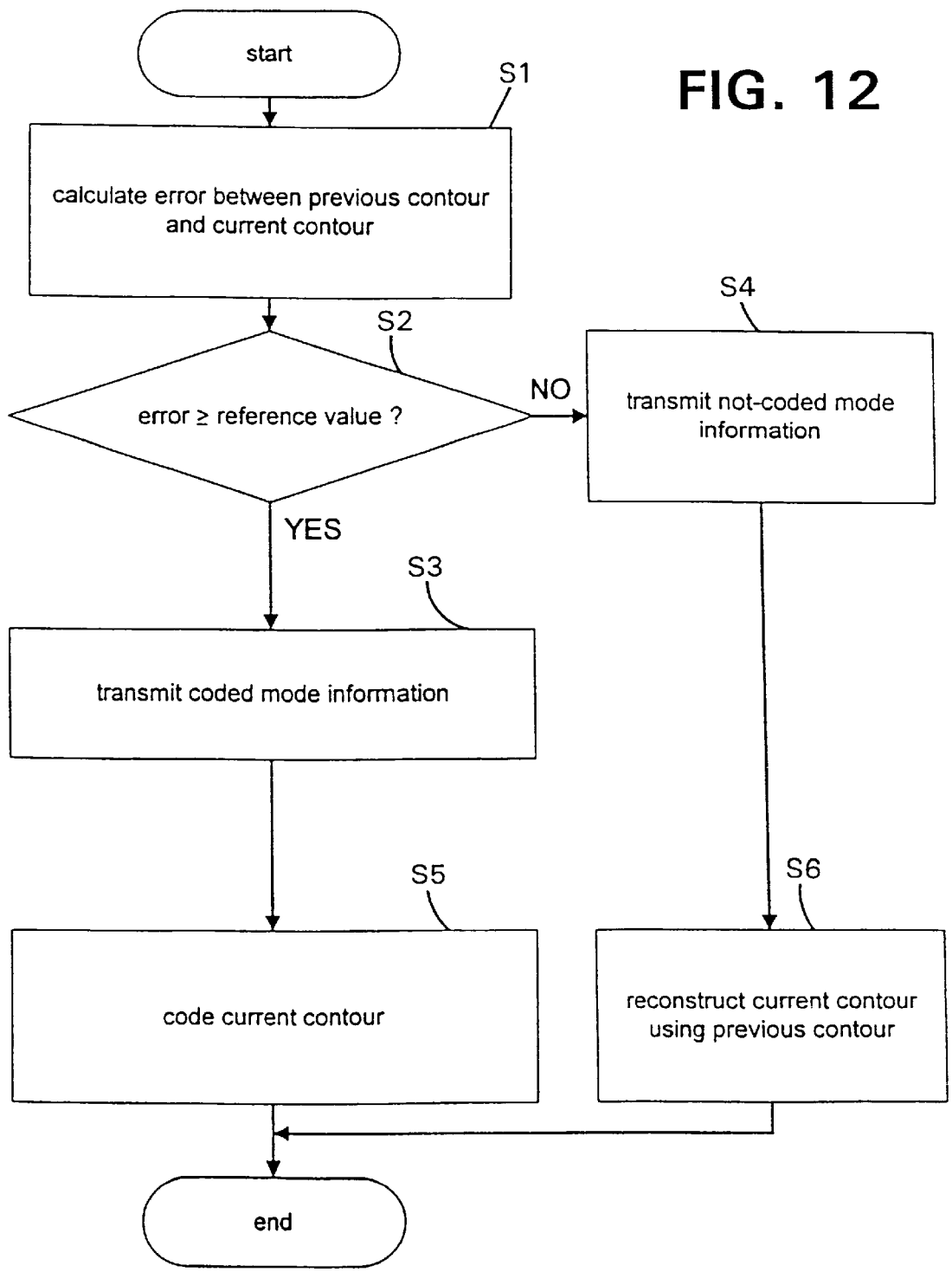
FIG. 12 is a flowchart illustrating a method for predictively coding a contour of a video signal in accordance with the present invention.

Now, the preferred embodiment of the present invention will be mentioned in detail with reference to FIGS. 11 and 12.

FIG. 11 is a schematic block diagram illustrating the construction of an apparatus for predictively coding a contour of a video signal in accordance with the present invention.

Preferably, the contour predictive coding apparatus may be implemented on the basis of a vertex-based shape coding technique. As shown in FIG. 11, the contour predictive coding apparatus comprises a corresponding contour detector 62, a coding determination unit 65, an encoder 70, a memory 57 and a contour reconstruction unit 64.

The corresponding contour detector 62 is adapted to compare vertices of the current contour with those of the previous contours stored in the memory 57 to detect the previous contour most approximate to the current contour from the memory 57.

The most approximate previous contour (vertices), or reconstructed contour, determined by the corresponding contour detector 62 is outputted from the memory 57.

The coding determination unit 65 is adapted to compare the current contour with the reconstructed contour from the memory 57 to determine whether the current contour is to be coded. Namely, the coding determination unit 65 compares the current contour with the previous contour in an inter mode to obtain an error therebetween. If the obtained error is larger than a reference value, the current contour is coded. However, in the case where the obtained error is smaller than the reference value, the current contour is not coded.

A switch 69 is connected to the coding determination unit 65, for performing a switching operation in response to an output signal from the coding determination unit 65. If the current contour is to be coded, the central terminal of the switch 69 is connected to the first terminal thereof. However, in the case where the current contour is not to be coded, the central terminal of the switch 69 is connected to the second terminal thereof.

In the case where the current contour is to be coded, the current contour and the reconstructed contour (vertices) from the memory 57 are applied to the encoder 70.

The encoder 70 includes a vertex reconstruction unit 66 and a vertex insertion unit 67. The vertex reconstruction unit 66 reconstructs new vertices on the basis of polygon approximation. The vertex insertion unit 67 inserts the new vertices reconstructed by the vertex reconstruction unit 66 into a vertex list therein.

The contour encoded by the encoder 70 is fed back to the contour (vertex) reconstruction unit 64 which reconstructs that contour (vertex).

The contour reconstructed by the contour (vertex) reconstruction unit 64 is stored in the memory 57.

FIG. 12 is a flowchart illustrating a method for predictively coding a contour of a video signal in accordance with the present invention.

Preferably, the contour predictive coding method may be implemented on the basis of a vertex-based shape coding technique.

First, the error calculation step S1 is performed to calculate an error between the current contour and the previous contour through the comparison therebetween.

At the error calculation step S1, the nearest distance of each of pixels in the current contour to the previous contour is determined as the current contour pixel error and the maximum one of the determined current contour pixel errors is detected. Alternatively, the nearest distance of each of pixels in the previous contour to the current contour is determined as the previous contour pixel error and the maximum one of the determined previous contour pixel errors is detected.

After the error calculation step S1 is performed, the error comparison step S2 is performed to compare the error calculated at the error calculation step S1 with a predetermined reference value. In the case where the calculated error is larger than or equal to the reference value at the error comparison step S2, or the current contour has a variation with respect to the previous contour, the coded mode information transmission step S3 is performed to transmit a bit of, for example, logic "1" as coded mode information.

If the case where the calculated error is smaller than the reference value at the error comparison step S2, or the current contour has no variation with respect to the previous contour, the not-coded mode information transmission step S4 is performed to transmit a bit of, for example, logic "0" as not-coded mode information.

Alternatively, a bit of logic "0" may be transmitted as the coded mode information at the coded mode information transmission step S3, and a bit of logic "1" may be transmitted as the not-coded mode information at the not-coded mode information transmission step S4.

If the coded mode information is transmitted at the coded mode information transmission step S3, the contour coding step S5 is performed to code the current contour in contour units or lower-order units such as macro blocks. At this time, the contour coding is performed in a polygon or spline manner.

However, in the case where the not-coded mode information is transmitted at the not-coded mode information transmission step S4, the contour reconstruction step S6 is performed to reconstruct the current contour using the previous contour, instead of coding the current contour. In this case, the not-coded mode information is transmitted to the decoder for the reconstruction of the current contour using the previous contour.

Preferably, the most recently coded contour must be used as the previous contour to reduce an error due to the accumulation of fine variations.

In the case where the just previously inputted contour is used as the previous contour regardless of whether the current contour is coded or not, a discrete video appears due to the accumulation of errors resulting from motions below the reference value. Therefore, the most recently coded contour is employed as the previous contour to prevent the video discreteness due to the accumulation of fine variations.

The not-coded mode information is transmitted to the decoder in the form of one bit being contained in the bit stream from the encoder 70. In response to the state of the transmitted bit, the decoder determines whether the current contour has been coded. If it is determined that the current contour has been coded, the decoder recognizes the following bit stream as the coded current contour signal and then restores it to the original image. However, in the case where it is determined that the current contour has not been coded, the decoder reconstructs the current contour using the previously transmitted contour and then restores it to the original image.

As apparent from the above description, the present invention provides the method and apparatus for predictively coding the contour of the video signal. A difference between the current contour and the previous contour is obtained through the comparison therebetween. Only when the obtained difference exceeds the predetermined reference value, the current contour is coded. Otherwise, only a signal indicative of the reconstruction of the current contour using the previous contour is transmitted to the decoder. Therefore, the transmission of unnecessary information is prevented to enhance the compression coding efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for predictively coding a contour of a video signal, comprising the steps of:

(a) comparing the current contour with the previous contour to obtain an error therebetween and then comparing the obtained error with a predetermined reference value to check whether the obtained error is greater than or equal to said predetermined reference value;

(b) coding the current contour if it is checked at said step (a) that the obtained error is greater than or equal to said predetermined reference value and avoiding coding the current contour if it is checked at step (a) that the obtained error is smaller than said predetermined reference value; and (c) transmitting information to a decoder to indicate whether the current contour is coded or not, wherein said information is transmitted in the form of a bit of logic "1" or "0" to a decoder, said bit being contained in a bit stream to be transmitted to said decoder.

2. A method for predictively coding a contour of a video signal, as set forth in claim 1, wherein the previous contour is the most recently coded contour.

3. A method for predictively coding a contour of a video signal, as set forth in claim 1, wherein said step (a) includes the step of determining the nearest distance of each of pixels in the current contour to the previous contour as a current contour pixel error, detecting the maximum one of the determined current contour pixel errors, determining the nearest distance of each of pixels in the previous contour to the current contour as a previous contour pixel error, detecting the maximum one of the determined previous contour pixel errors and comparing the larger one of the detected maximum current and previous contour pixel errors with said predetermined reference value.

4. A method for predictively coding a contour of a video signal, as set forth in claim 1, wherein said step (a) includes the step of moving the previous contour to a position of the current contour and comparing the nearest inter-pixel distance between the current contour and the previous contour with said predetermined reference value.

5. A method for predictively coding a contour of a video signal, as set forth in claim 4, wherein said contour moving position is determined in a motion compensation prediction manner where contour moving direction, speed and time are considered.

6. A method for predictively coding a contour of a video signal, as set forth in claim 4, wherein said contour moving position is determined in a non-motion compensation prediction manner.

7. A method for predictively coding a contour of a video signal, as set forth in claim 1, wherein said step (a) includes the step of moving the current contour to a position of the previous contour and comparing the nearest inter-pixel distance between the current contour and the previous contour with said predetermined reference value.

8. A method for predictively coding a contour of a video signal, as set forth in claim 7, wherein said contour moving position is determined in a motion compensation prediction manner.

9. A method for predictively coding a contour of a video signal, as set forth in claim 7, wherein said contour moving position is determined in a non-motion compensation prediction manner.

10. A method for predictively coding a contour of a video signal, as set forth in claim 1, further comprising the step of detecting the nearest distance of each of pixels in the current contour to the previous contour and setting a negligible one of the detected distances to said reference value.

11. A method for predictively coding a contour of a video signal, as set forth in claim 1, further comprising the step of detecting the nearest distance of each of pixels in the previous contour to the current contour and setting a negligible one of the detected distances to said reference value.

12. A method for predictively coding a contour of a video signal, as set forth in claim 1, further comprising the step of detecting the nearest distance of each of pixels in the current contour to the previous contour, detecting the nearest distance of each of pixels in the previous contour to the current contour and setting a negligible one of the detected distances to said reference value.

13. A method for predictively coding a contour of a video signal, as set forth in claim 1, wherein the bit of logic "1" indicates that the current contour is coded.

14. A method for predictively coding a contour of a video signal, as set forth in claim 1, wherein the bit of logic "0" indicates that the current contour is not coded.

15. An apparatus for predictively coding a contour of a video signal, comprising:

corresponding contour detection means for comparing the current contour with reconstructed contours stored in a memory to detect the reconstructed contour most approximate to the current contour from a memory;

coding determination means for comparing the current contour with the reconstructed contour from said memory to determine whether the current contour is to be coded or not;

encoding means for encoding the current contour in response to an output signal from said coding determination means, said encoding means including vertex reconstruction means for reconstructing new vertices on the basis of polygon approximation, and vertex insertion means for inserting the new vertices reconstructed by said vertex reconstruction means into a vertex list therein; and contour reconstruction means for reconstructing the contour encoded by said encoding means, wherein said coding determination means compares the current contour with the previous contour to obtain an error therebetween, determines that the current contour is to be coded, if the obtained error is larger than a reference value, and determines that the current contour is not to be coded, if the obtained error is smaller than said reference value.

* * * * *